US012604370B2

(12) United States Patent
Leigh

(10) Patent No.: US 12,604,370 B2
(45) Date of Patent: Apr. 14, 2026

(54) HIGH VOLTAGE CERAMIC ELECTRIC HEATING ELEMENT

(71) Applicant: CHONGQING LE-MARK CERAMIC TECHNOLOGY CO., LTD., Chongqing (CN)

(72) Inventor: Peter Leigh, Chongqing (CN)

(73) Assignee: CHONGQING LE-MARK CERAMIC TECHNOLOGY CO., LTD., Chongqing (CN)

( * ) Notice: Subject to any disclaimer, the term of this patent is extended or adjusted under 35 U.S.C. 154(b) by 973 days.

(21) Appl. No.: 17/292,112

(22) PCT Filed: Nov. 11, 2019

(86) PCT No.: PCT/CN2019/117043
§ 371 (c)(1),
(2) Date: Oct. 13, 2021

(87) PCT Pub. No.: WO2020/125267
PCT Pub. Date: Jun. 25, 2020

(65) Prior Publication Data

US 2022/0039210 A1 Feb. 3, 2022

(30) Foreign Application Priority Data

Dec. 18, 2018 (CN) ......................... 201811548834.0

(51) Int. Cl.
*H05B 3/14* (2006.01)
*H05B 3/48* (2006.01)

(52) U.S. Cl.
CPC ............... *H05B 3/141* (2013.01); *H05B 3/48* (2013.01); *H05B 2203/027* (2013.01)

(58) Field of Classification Search
CPC .... H05B 3/141; H05B 3/48; H05B 2203/027; H05B 3/46; H05B 3/06; H05B 3/10; H05B 3/44; F23Q 7/001; F23Q 7/10
See application file for complete search history.

(56) References Cited

U.S. PATENT DOCUMENTS 6,084,220 A 7/2000 Suematsu
6,130,410 A * 10/2000 Kita ........................ F23Q 7/001 219/544

(Continued)

FOREIGN PATENT DOCUMENTS

CN 2393295 Y * 8/2000
CN 2415573 1/2001

(Continued)

OTHER PUBLICATIONS

Translation of CN-2393295-Y (Year: 2000).*

(Continued)

*Primary Examiner* — Elizabeth M Kerr
(74) *Attorney, Agent, or Firm* — FisherBroyles, LLP; Jason P. Mueller

(57) ABSTRACT

A high-voltage ceramic electric heating element, comprising a body (9), the body (9) being hollow and having an open trailing portion, and a notch (7) being provided on the body (9) in the axial direction and extending through from left to right; a temperature control region (8) is provided at a position on an outer resistance layer (2) of the body (9), and the cross sectional area of the temperature control region (8) is smaller than the cross sectional area of the body (9). Using the high-voltage ceramic electric heating element can improve the ignition reliability and the service life.

10 Claims, 3 Drawing Sheets

(56) References Cited

U.S. PATENT DOCUMENTS

| | | | | |
|---|---|---|---|---|
| 2007/0221647 | A1 | 9/2007 | Walker, Jr. | |
| 2014/0219641 | A1 | 8/2014 | Dauth | |
| 2018/0302954 | A1 * | 10/2018 | Lutz, II .................... | H05B 3/82 |

FOREIGN PATENT DOCUMENTS

| | | | | |
|---|---|---|---|---|
| CN | 2536382 | | | 2/2003 |
| CN | 2728154 | | | 9/2005 |
| CN | 200941685 | Y | * | 8/2007 |
| CN | 101132656 | | | 2/2008 |
| CN | 100496168 | | | 6/2009 |
| CN | 202945381 | | | 5/2013 |
| CN | 109526079 | | | 3/2019 |
| CN | 209824059 | | | 12/2019 |
| JP | S5495628 | | | 7/1979 |
| JP | S58150715 | | | 9/1983 |
| JP | S5958773 | | | 4/1984 |
| JP | H11185936 | | | 7/1999 |
| JP | 2004281369 | A | * | 10/2004 |
| JP | 2012160272 | | | 8/2012 |
| JP | 2017202950 | | | 11/2017 |
| KR | 20180096414 | A | * | 8/2018 |

OTHER PUBLICATIONS

Translation of CN-200941685-Y (Year: 2007).*
Translation of KR-20180096414-A (Year: 2018).*
Translation of JP-2004281369-A (Year: 2004).*

* cited by examiner

HIGH VOLTAGE CERAMIC ELECTRIC HEATING ELEMENT

This patent application is a 35 U.S.C. § 371 national stage application based on and claiming propriety to PCT/CN2019/117043, filed on Nov. 11, 2019, which in turn claims priority to Chinese Patent Application CN 201811548834.0, filed on Dec. 18, 2018, the disclosures of which are incorporated by reference in theor entireties.

TECHNICAL FIELD

The present disclosure relates to an electric heating element, and in particular to a high-voltage ceramic electric heating element having a layered structure.

BACKGROUND

In the prior art, ceramics can be used for an electric heating element for ignition, e.g. ignition of motor vehicle engines, gas ignition, etc. During use, a ceramic electric heating element has the advantages of high reliability and stability and a long service life.

The existing ceramic electric heating elements are divided into high-voltage ceramic electric heating elements and low-voltage ceramic electric heating elements depending on the voltage that can be withstood. Generally, ceramic electric heating elements that can withstand voltage higher than 100V, e.g. 120V and 220V, are high-voltage ceramic electric heating elements, and ceramic electric heating elements that can withstand voltage lower than 100V are low-voltage ceramic electric heating elements.

A low-voltage ceramic electric heating element requires a relatively small resistance, and has a heating temperature lower than the heating temperature of a high-voltage ceramic electric heating element. For example, the six-layered ceramic electric heating element in Chinese patent no. CN 200620033322.7 and the three-layered, four-layered, five-layered, and six-layered ceramic electric heating elements in Chinese patent no. CN200410040517. X are low-voltage ceramic electric heating elements. A low-voltage ceramic electric heating element has a small resistance, and an easily controlled temperature zone.

A high-voltage ceramic electric heating element requires a higher heating temperature and thus requires a larger resistance. In order to form a larger resistance, a resistor needs to be manufactured larger in volume, and a large-volume resistance layer has a large temperature zone, so that the heating region is not easily controlled. For example, Chinese patent no. CN200420060870. X discloses a four-layered ceramic electric heating element having a slot at a lower section, and such a ceramic electric heating element is a high-voltage ceramic electric heating element.

However, during actual use, according to user's responses, uncertain up-and-down displacements of the temperature zones of the existing high-voltage ceramic electric heating elements occur along with the increase of use, resulting in the fact that the ignition reliability cannot be effectively ensured after a period of use. Furthermore, the existing high-voltage ceramic electric heating elements have a short service life, which is shorter than or equal to 100 H, in a continuous energized state and have a service life of less than or equal to 5000 times in a flame combustion chamber, and have poor surface quality, a loose structure, and low strength of lower than or equal to 20 KG.

SUMMARY

An object of the present disclosure is to provide a high-voltage ceramic electric heating element, which can solve the technical problem of low ignition reliability and a short service life of the existing high-voltage ceramic electric heating elements in use.

In order to achieve the described objectives, the present disclosure is implemented as follows: a high-voltage ceramic electric heating element, comprising a body, the body being hollow and having an open trailing portion, and a notch being provided on the body in the axial direction and extending through from left to right, characterized in that a temperature control region is provided at a position on an outer resistance layer of the body, and the cross sectional area of the temperature control region is smaller than the cross sectional area of the body. By reducing the cross sectional area of the temperature control region, the large-voltage ceramic electric heating element configured using the described manner can ensure that temperature zones are controlled in the temperature control region, i.e. ensuring that heating and ignition are performed in the temperature control region. In this way, the control of the temperature zones avoids up and down displacement of the temperature zones, ensuring the reliability of ignition. In addition, controlling the temperature zones in the temperature control region can avoid damage to weak portions in the process of up and down displacement of the temperature zones, improving the service life of the ceramic electric heating element.

In order to further improve the service life of the high-voltage ceramic electric heating element, the temperature control region is provided at a head portion of the body.

In order to further improve the ignition reliability and service life of the high-voltage ceramic electric heating element, the cross sectional area of the temperature control region is smaller than the cross sectional area of the body by at least 10%.

In order to further improve the reliability of the structure, the body is cylindrical, and the temperature control region has a radially inward section with respect to one or more sides of the body.

In order to further improve the reliability of the structure, the temperature control region is of a flat shape having the radially inward section with respect to two opposite sides. Using such a configuration manner can simplify the process and reduce the cost.

In order to further improve the service life and structural strength, the ceramic electric heating element is molded by slip casting, and a slip casting through hole is provided at the top end of the head portion of the body.

Preferably, the ceramic electric heating element has four layers, which are, from inside to outside of the body, an inner insulation enhancement layer, an inner insulating layer, an outer resistance layer, and an electrically conductive layer, the inner insulation enhancement layer. The inner insulating layer, and the outer resistance layer cover the entirety of the body, and the electrically conductive layer covers a trailing portion of the outer resistance layer, a trailing end of the electrically conductive layer being positive and negative electrode positions.

In order to further improve the service life and strength, the ceramic material of the inner insulating layer and the inner insulation enhancement layer is prepared with the following materials in parts by weight: silicon nitride:aluminum oxide:yttrium oxide:lanthanum oxide:molybdenum disilicide=(200 to 800):(20 to 90):(20 to 90):(10 to 80):(10 to 800).

In order to further improve the service life and strength, the ceramic material of the outer electrically conductive layer is prepared with the following materials in parts by weight: silicon nitride:aluminum oxide:yttrium oxide:lanthanum oxide:molybdenum disilicide=(200 to 800):(20 to 90):(20 to 90):(10 to 80):(700 to 3000).

In order to further improve the service life and strength, the outer resistance layer is prepared with the following materials in parts by weight: silicon nitride:aluminum oxide:yttrium oxide:lanthanum oxide:molybdenum disilicide=(200 to 800):(20 to 90):(20 to 90):(10 to 80):(600 to 900).

Advantageous Effects

1. Using the high-voltage ceramic electric heating element of the present disclosure can effectively control a heating region in a temperature control region during use, avoiding up and down displacement of the temperature zones, effectively ensuring the reliability of ignition, so that the success rate of ignition is 100%.
2. As the trailing portion is the farthest end during the slip casting process, the quality of the head portion of the ceramic electric heating element is better than the quality of the trailing portion, and controlling the temperature zones at the head portion can avoid damage to the trailing portion during the up and down displacement of the temperature zones, improving the service life of the high-voltage ceramic electric heating element; in addition, the combination of the new formulation of each layer in the present disclosure further improves the service life of the ceramic electric heating element. According to tests, the high-voltage ceramic electric heating element of the present disclosure has a service life of longer than or equal to 240 H in a continuous energized state, and has a service life of more than or equal to 30000 times in a flame combustion chamber.
3. The high-voltage ceramic electric heating element in the present disclosure has a smooth surface and a compact structure, and has strength of higher than or equal to 50 KG.

DETAILED DESCRIPTION OF THE EMBODIMENTS

Specific embodiments of the present disclosure will be further described in detail below in view of the accompanying drawings. However, the present disclosure is not limited to these embodiments, and any improvement or substitution in the basic spirit of the embodiments still belongs to the scope of protection of the claims of the present disclosure.

Figure 1:
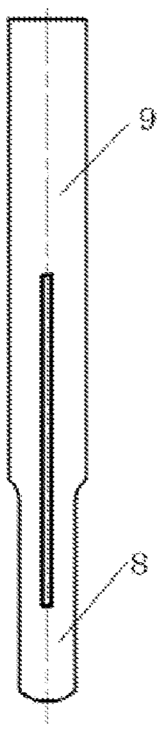
FIG. 1 is a diagram illustrating the structure of a four-layered ceramic electric heating element.
Figure 2:
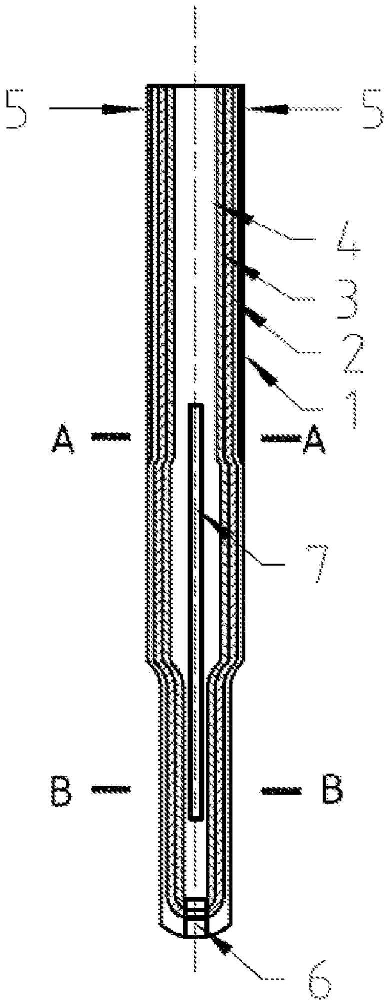
FIG. 2 is a cross sectional view of FIG. 1.
Figure 3:
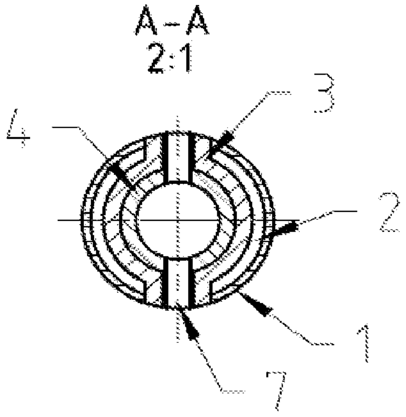
FIG. 3 is a cross sectional view of FIG. 2 along A-A.
Figure 4:
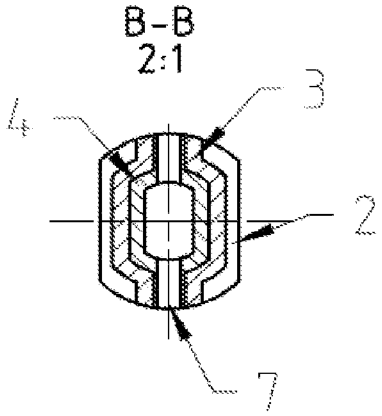
FIG. 4 is a cross sectional view of FIG. 2 along B-B.

Embodiment 1: as shown in FIGS. 1 to 4, a high-voltage ceramic electric heating element, comprising a body, the body being hollow and having an open trailing portion, and a notch being provided on the body in the axial direction and extending through from left to right; a temperature control region is provided at a position on an outer resistance layer of the body, and the cross sectional area of the temperature control region is smaller than the cross sectional area of the body.

The temperature control region can be provided at any position of an outer resistance layer of the body, for example, at the middle portion, the head portion, or the trailing portion of the body. However, in this embodiment, in consideration of process conditions, the temperature control region is preferably provided at a head portion of the body. The axial length and the cross sectional area of the temperature control region can be set according to actual situations.

In this embodiment, the cross sectional area of the temperature control region is smaller than the cross sectional area of the body by at least 10%. The cross sectional area of the temperature control region can be set to be 10%, 20%, 30%, 40%, 50%, 60%, etc. smaller than the area of the body.

The high-voltage ceramic electric heating element can have two layers, three layers, four layers, five layers, six layers, etc.

In addition, the ceramic electric heating element in the embodiment is manufactured by means of a slip casting process. A slip casting through hole is provided at the head portion of the body, and slip casting is performed through the slip casting through hole to the trailing portion. The slip casting process is performed from outside to inside, and the middle portion is kept hollow. In the process of the slip casting, the position of a notch is reserved by means of a tool.

Using the high-voltage ceramic electric heating element of this embodiment effectively ensures the reliability of ignition, so that the success rate of ignition is 100%. The service life may reach 240 H in a continuous energized state, and the service life may reach 30000 times in a flame combustion chamber. The high-voltage ceramic electric heating element of this embodiment has a smooth surface, a compact structure, and has strength of 50 KG.

Embodiment 2: as shown in FIGS. 1 to 4, a high-voltage ceramic electric heating element, comprising a body, the body being hollow and having an open trailing portion, and a notch being provided on the body in the axial direction and extending through from left to right; a temperature control region is provided at a position on an outer resistance layer of the body, and the cross sectional area of the temperature control region is smaller than the cross sectional area of the body.

The temperature control region can be provided at any position of an outer resistance layer of the body, for example, at the middle portion, the head portion, or the trailing portion of the body. However, in this embodiment, in consideration of process conditions, the temperature control region is preferably provided at a head portion of the body. The axial length and the cross sectional area of the temperature control region can be set according to actual situations.

In this embodiment, the cross sectional area of the temperature control region is smaller than the cross sectional area of the body by at least 10%. The cross sectional area of the temperature control region can be set to be 10%, 20%, 30%, 40%, 50%, 60%, etc. smaller than the area of the body.

The high-voltage ceramic electric heating element can have two layers, three layers, four layers, five layers, six layers, etc.

In addition, the ceramic electric heating element in the embodiment is manufactured by means of a slip casting process. A slip casting through hole is provided at the head portion of the body, i.e. the top portion of the temperature control region, and slip casting is performed through the slip casting through hole to the trailing portion. The slip casting process is performed from outside to inside, and the middle portion is kept hollow. In the process of the slip casting, the position of a notch is reserved by means of a tool.

In this embodiment, the body is cylindrical. The temperature control region and the body are integrally molded by slip casting. Thus, the temperature control region can be configured in various forms to have a smaller cross sectional area, that is to say, the cross section of the temperature control region can be configured to have various shapes, for example, a cylinder concentric with the body but having a smaller diameter, a triangle, a quadrangle, or other irregular shapes.

However, in this embodiment, the temperature control region is of a flat shape having the radially inward section with respect to two opposite sides.

Using the high-voltage ceramic electric heating element of this embodiment effectively ensures the reliability of ignition, so that the success rate of ignition is 100%. The service life may reach 260 H in a continuous energized state, and the service life may reach 32000 times in a flame combustion chamber. The high-voltage ceramic electric heating element of this embodiment has a smooth surface, a compact structure, and has strength of 55 KG.

Embodiment 3: as shown in FIGS. 1 to 4, this embodiment provides a four-layered high-voltage ceramic electric heating element, comprising a body 9. The body has, from inside to outside, an inner insulation enhancement layer 4, an inner insulating layer 3, an outer resistance layer 2, and an electrically conductive layer 1. The inner insulation enhancement layer, the inner insulating layer, and the outer resistance layer cover the entirety of the body, and the electrically conductive layer covers a trailing portion of the outer resistance layer, a trailing end of the electrically conductive layer provides positive and negative electrode positions 5.

The head portion of the ceramic electric heating element is of a flat shape formed by inwardly inclining left and right sides, and the flat shape is the temperature control region 8. In this embodiment, the cross sectional area of the temperature control region is 80% of the cross sectional area of the body, and the axial length of the temperature control region is 30% of the axial length of the body.

A slip casting through hole 6 is provided at the top portion of the temperature control region, and the body is provided with a notch 7 extending through from left to right. The width of the notch 7 can be about 2 to 5 mm, and can be selected from, but not limited to, 2 mm, 3 mm, 4 mm, or 5 mm. The notch can extend from the electrically conductive layer portion to the temperature control region in length.

All the layers are made of ceramic materials, and are prepared with five ceramic materials, i.e. silicon dioxide, molybdenum disilicide, aluminium oxide, yttrium oxide, and lanthanum oxide, and water. Silicon oxide functions to form a network structure, aluminium oxide, yttrium oxide, and lanthanum oxide function to adjust the network structure, and molybdenum disilicide functions to form a conductive heating material.

The ceramic material of the inner insulating layer and the inner insulation enhancement layer is prepared with the following materials in parts by weight: silicon nitride:aluminum oxide:yttrium oxide:lanthanum oxide:molybdenum disilicide=(200 to 800):(20 to 90):(20 to 90):(10 to 80):(10 to 800).

The following ratios can be used, but are not limited: I. silicon nitride:aluminum oxide:yttrium oxide:lanthanum oxide:molybdenum disilicide=200:20:20:10:10; II. silicon nitride:aluminum oxide:yttrium oxide:lanthanum oxide:molybdenum disilicide=800:90:90:80:800; III. silicon nitride:aluminum oxide:yttrium oxide:lanthanum oxide:molybdenum disilicide=400:50:40:40:400.

The ceramic material of the outer electrically conductive layer is prepared with the following materials in parts by weight: silicon nitride:aluminum oxide:yttrium oxide:lanthanum oxide:molybdenum disilicide=(200 to 800):(20 to 90):(20 to 90):(10 to 80):(700 to 3000).

The following ratios can be used, but are not limited: I. silicon nitride:aluminum oxide:yttrium oxide:lanthanum oxide:molybdenum dicinnamate=200:20:20:10:700; II. silicon nitride:aluminum oxide:yttrium oxide:lanthanum oxide:molybdenum disilicide=800:90:90:80:3000; III. silicon nitride:aluminum oxide:yttrium oxide:lanthanum oxide:molybdenum disilicide=400:50:40:40:1500.

The ceramic material of the outer resistance layer is prepared with the following materials in parts by weight: silicon nitride:aluminum oxide:yttrium oxide:lanthanum oxide:molybdenum disilicide=(200 to 800):(20 to 90):(20 to 90):(10 to 80):(600 to 900).

The following ratios can be used, but are not limited: I. silicon nitride:aluminum oxide:yttrium oxide:lanthanum oxide:molybdenum disilicide=200:20:20:10:600; II. silicon nitride:aluminum oxide:yttrium oxide:lanthanum oxide:molybdenum disilicide=800:90:90:80:900; III. silicon nitride:aluminum oxide:yttrium oxide:lanthanum oxide:molybdenum disilicide=400:50:40:40:300.

Using the high-voltage ceramic electric heating element of this embodiment effectively ensures the reliability of ignition, so that the success rate of ignition is 100%. The service life may reach 300 H in a continuous energized state, and the service life may reach 36000 times in a flame combustion chamber. The high-voltage ceramic electric heating element of this embodiment has a smooth surface, a compact structure, and has strength of 60 KG.

The invention claimed is:

1. A high-voltage ceramic electric heating element, comprising a body, the body being hollow and having an open trailing portion, and a notch being provided on the body in an axial direction and extending through the body, wherein a temperature control region is provided at a position on an outer resistance layer of the body, and the temperature control region has a cross sectional area smaller than a cross sectional area of the body, wherein the notch extends along a length of the body in the axial direction and extends through the body from a first side of the body to a second side transverse to the axial direction.

2. The high-voltage ceramic electric heating element according to claim 1, wherein the temperature control region is provided at a head portion of the body.

3. The high-voltage ceramic electric heating element according to claim 1, wherein the cross sectional area of the temperature control region is smaller than the cross sectional area of the body by at least 10%.

4. The high-voltage ceramic electric heating element according to claim 1, wherein the body is cylindrical, and the temperature control region has a radially inward section with respect to one or more sides of the body.

5. The high-voltage ceramic electric heating element according to claim 4, wherein the temperature control region has a flat shape from the radially inward section with respect to two opposite sides.

6. The high-voltage ceramic electric heating element according to claim 2, wherein the ceramic electric heating element is molded by slip casting, and a slip casting through hole is provided at a top end of the head portion of the body.

7. The high-voltage ceramic electric heating element according to claim 1, wherein the ceramic electric heating element has four layers, which include, from an inside to an outside of the body, an inner insulation enhancement layer, an inner insulating layer, an outer resistance layer, and an electrically conductive layer, wherein the inner insulation enhancement layer, the inner insulating layer, and the outer resistance layer cover an entirety of the body, the electrically conductive layer covers a trailing portion of the outer resistance layer, and a trailing end of the electrically conductive layer includes positive and negative electrode positions.

8. The high-voltage ceramic electric heating element according to claim 7, wherein each of the inner insulating layer and the inner insulation enhancement layer comprises a ceramic material prepared with the following materials in parts by weight: silicon nitride: aluminum oxide: yttrium oxide: lanthanum oxide: molybdenum disilicide=(200 to 800):(20 to 90):(20 to 90):(10 to 80):(10 to 800).

9. The high-voltage ceramic electric heating element according to claim 7, wherein the outer electrically conductive layer comprises a ceramic material prepared with the following materials in parts by weight: silicon nitride: aluminum oxide: yttrium oxide: lanthanum oxide: molybdenum disilicide=(200 to 800):(20 to 90):(20 to 90):(10 to 80): (700 to 3000).

10. The high-voltage ceramic electric heating element according to claim 7, wherein the outer resistance layer comprises a ceramic material prepared with the following materials in parts by weight: silicon nitride: aluminum oxide: yttrium oxide: lanthanum oxide: molybdenum disilicide=(200 to 800):(20 to 90):(20 to 90):(10 to 80):(600 to 900).

* * * * *